(12) United States Patent
Singh et al.

(10) Patent No.: US 9,702,450 B2
(45) Date of Patent: Jul. 11, 2017

(54) CONTINUOUSLY VARIABLE TRANSMISSION WITH DIRECTION SELECTION MECHANISM

(71) Applicant: GM Global Technology Operations LLC, Detroit, MI (US)

(72) Inventors: Tejinder Singh, Commerce Township, MI (US); Boris Burgman, Oak Park, MI (US); Arvo J. Siismets, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 14/540,751

(22) Filed: Nov. 13, 2014

(65) Prior Publication Data

US 2016/0138694 A1    May 19, 2016

(51) Int. Cl.
| | | |
|---|---|---|
| *F16H 9/26* | (2006.01) | |
| *F16H 57/04* | (2010.01) | |
| *F16H 9/18* | (2006.01) | |
| *F16H 37/02* | (2006.01) | |

(52) U.S. Cl.
CPC .......... *F16H 57/0484* (2013.01); *F16H 9/18* (2013.01); *F16H 37/022* (2013.01)

(58) Field of Classification Search
CPC ...................................................... F16H 9/26
See application file for complete search history.

(56) References Cited

U.S. PATENT DOCUMENTS

| | | | | |
|---|---|---|---|---|
| 5,063,815 A | * | 11/1991 | Oshidari | F16H 37/0846 477/38 |
| 5,924,534 A | * | 7/1999 | Okubo | F16H 37/021 192/3.24 |
| 2005/0107195 A1 | * | 5/2005 | Katou | F16H 63/065 474/28 |
| 2006/0070839 A1 | * | 4/2006 | Sugano | F16H 63/3416 192/219.5 |
| 2006/0111207 A1 | * | 5/2006 | Ogata | F16H 61/0021 474/28 |

* cited by examiner

*Primary Examiner* — Tisha Lewis

(57) ABSTRACT

A continuously variable automatic transmission having a direction selection mechanism with both friction and binary torque transmitting devices. The transmission includes a torque converter which drives a ring gear of a planetary gear assembly. The sun gear of the planetary assembly drives the input of a variable ratio device. In one embodiment, the friction brake is disposed between a planetary gear carrier and a stationary housing or ground and is engaged to provide reverse direction of travel. The binary clutch is disposed between the ring gear and the planet carrier and, when engaged, locks the planetary gear assembly and provides forward direction of travel. In other embodiments, a binary brake is disposed between the planetary gear carrier and the housing and is engaged to provide reverse travel and a friction clutch is disposed between the ring gear and the planet carrier and, when engaged, locks the planetary assembly and provides forward travel.

12 Claims, 4 Drawing Sheets

CONTINUOUSLY VARIABLE TRANSMISSION WITH DIRECTION SELECTION MECHANISM

FIELD

The present disclosure relates to continuously variable automatic transmissions for motor vehicles and more particularly to continuously variable automatic transmissions for motor vehicles having a direction selection mechanism with a binary clutch.

BACKGROUND

The statements in this section merely provide background information related to the present disclosure and may or may not constitute prior art.

Continuously variable transmissions (CVT's) provide exceptional torque and speed engine and load matching. Because of this inherent feature, and because of the ever increasing emphasis on fuel economy, they have become correspondingly popular, especially in lower horsepower vehicles intended for the mass market.

Accordingly, significant engineering effort has been directed to this transmission type in recent years to optimize performance, efficiency and ruggedness while reducing weight and complexity. Not only is development effort directed to the continuously variable portion of the transmission, i.e., a twin pulley and belt arrangement or a variator, but also to the associated components which provide forward and reverse and multiple modes (speed ranges) inasmuch as these components also significantly impact fuel economy and performance.

Specifically, a vast majority of automatic transmissions, both planetary gear types and continuously variable types, utilize friction pack clutches and brakes. While these devices are capable of transmitting significant torque through a relatively small package, because they comprise first and second pluralities of interleaved plates or discs, one plurality of which will typically be rotating and the other stationary when the device is not engaged, they generate spin losses—losses which may be of significant magnitude if the speed difference across the device is great. Hence, minimizing the number of friction pack clutches and brakes is, in itself, an approach to improving transmission efficiency.

SUMMARY

The present invention provides a continuously variable transmission having a direction selection mechanism with two torque transmitting devices: a clutch and a brake. The transmission includes a torque converter having an input coupled to the output of a prime mover and an output which is coupled to and drives a ring gear of a simple planetary gear assembly through a damper. The sun gear of the planetary assembly is coupled to and drives the input or drive pulley of the continuously variable ratio device. In a first embodiment, a friction brake is disposed between the planetary gear carrier and a stationary housing or ground and is engaged to provide reverse direction of travel. A binary clutch is disposed between the ring gear and the planet carrier and, when engaged, locks the planetary gear assembly and provides forward direction of travel. In second and third embodiments, a binary brake is disposed between the planetary gear carrier and a stationary housing or ground and is engaged to provide reverse direction of travel and a friction clutch is disposed between the ring gear and the planet carrier and, when engaged, locks the planetary gear assembly and provides forward direction of travel.

It is thus an aspect of the present invention to provide a continuously automatic variable transmission.

It is a further aspect of the present invention to provide a continuously variable transmission having a friction brake and a binary clutch.

It is a still further aspect of the present invention to provide a continuously variable transmission having a friction brake, a binary clutch and a simple planetary gear assembly.

It is a still further aspect of the present invention to provide a continuously variable transmission having a torque converter, a friction brake, a binary clutch and a simple planetary gear assembly.

It is a still further aspect of the present invention to provide a continuously variable transmission having a torque converter, a variable ratio device, a friction brake, a binary clutch and a simple planetary gear assembly.

It is a still further aspect of the present invention to provide a continuously variable transmission having a planetary gear assembly, a friction brake disposed between a planetary gear carrier and a stationary housing which provide reverse and a binary clutch.

It is a still further aspect of the present invention to provide a continuously variable transmission having a simple planetary gear assembly, a friction brake and a binary clutch which locks the planetary gear assembly and provides forward direction.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
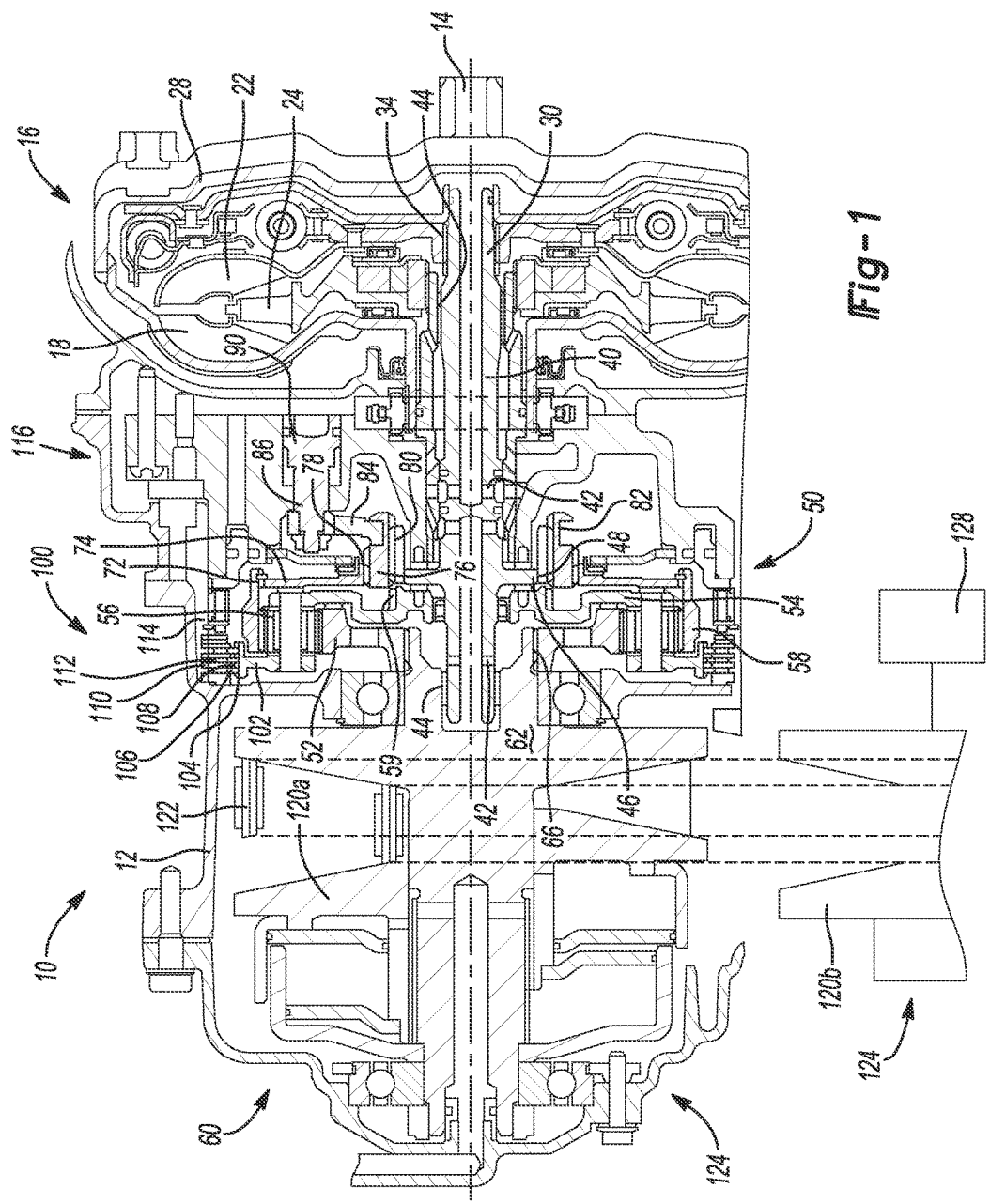
FIG. 1 is a full sectional view of a first embodiment of a continuously variable transmission incorporating the present invention.

With reference to FIG. 1, a continuously variable automatic transmission for a motor vehicle having two torque transmitting devices is illustrated and generally designated by the reference number 10. The continuously variable automatic transmission 10 includes a cast metal, multiple part housing 12 having a plurality of openings, flanges, surfaces and features which receive, position, support and protect the various components of the continuously variable automatic transmission 10. The automatic transmission 10 includes an input shaft or member 14 which drives a torque converter assembly 16 having an input pump 18, an output turbine 22 and a stator 24. The turbine 22 is coupled to and drives a damper 28 which is piloted on a turbine shaft or member 30 and which is coupled to and driven by the damper 28 through a spline set 34.

The turbine shaft or member 30 is hollow and defines a through axial passageway 40 which is supplied with pressurized hydraulic fluid which is dispersed within the automatic transmission through a plurality of radial ports 42. The turbine shaft or member 30 is supported at its ends by a pair of anti-friction bearings such as needle bearing assemblies 44. The turbine shaft or member 30 also includes a positioning flange or shoulder 46 having male spines or gear teeth 48 disposed about its periphery.

Radially adjacent the flange or shoulder 46 on the turbine shaft or member 30 is a planetary gear assembly 50. The planetary gear assembly 50 is disposed concentrically about the turbine shaft 30 and includes a sun gear 52, a planet gear carrier 54 and an annular ring gear 58. The planet gear carrier 54 includes a plurality of freely rotatable planet gears 56 which are in constant mesh with the sun gear 52 and the annular ring gear 58. The planet gear carrier 54 has a sinuous, complex shape, includes male or external splines or gear teeth 59 on a shoulder near the turbine shaft or member 30 and is piloted on the turbine shaft or member 30.

The sun gear 52 is the output gear of the planetary gear assembly 50 and is coupled to a hub 62 of a first pulley assembly of a variable ratio device 60 through an interconnected male and female spline set 66. The ring gear 58 is the input gear of the planetary gear assembly 50 and is coupled to the turbine shaft or member 30 through several concentrically disposed and interconnected components. Coupled to the annular ring gear 58 through an outer spline or gear set 72 is a flat, circular disc 74 which, in turn, is rotationally coupled to an axially sliding clutch hub or collar 76 through an interconnected male and female spline set 78. The clutch hub or collar 76 includes internal or female splines or gear teeth 80 complementary to and engaged by the male splines 48 on the flange or shoulder 46 of the turbine shaft or member 30 and is therefore rotationally coupled to and slides upon the male splines 48 on the flange or shoulder 46 of the turbine shaft or member 30.

The following paragraph describes a binary clutch operably disposed between the planet gear carrier 54 and the annular ring gear 58 of the automatic transmission 10 which provides forward gear and vehicle travel. As used throughout this specification and claims, the term "binary" refers to a clutch or brake that has essentially two operating states or positions: on or engaged and thus transferring torque and of or disengaged and thus transferring no torque.

The clutch hub or collar 76 also includes a circular channel or groove 82 which freely rotatably receives a shift fork 84. The shift fork 84 is, in turn, secured to an axially translating servo output shaft or member 86 which translates axially in response to electrical, hydraulic or pneumatic energy provided to a two state servo operator or actuator 90 which may be one of an electric, hydraulic or pneumatic type. In a first state, which may be either energized or de-energized, the servo output member 86 is retracted and the clutch hub or collar 76 is in the position illustrated in FIG. 1. In a second state, which may be either de-energized or energized, the servo output member 86 is extended and the clutch hub or collar 76 moves to the left. While maintaining the interconnection between the flat circular disc 74 (which is coupled to the ring gear 58) and the turbine shaft or member 30, the internal, female splines or gear teeth 80 on the clutch hub or collar 76 now engage the male splines or gear teeth 59 on the planet gear carrier 54 and connect all of these components together. This action provides the forward direction for the automatic transmission 10.

Disposed about the periphery of the annular ring gear 58 is a friction brake assembly 100. The friction brake assembly 100 includes an inner clutch hub 102 which is secured to the planet gear carrier 54 and includes a plurality of male splines 104 which engage a like plurality of female spines 106 on the interior of a first plurality of friction clutch discs 108. Interleaved with the first plurality of clutch discs 108 is a second plurality of reaction plates 110 having exterior or male spline 112 which engage and are held stationary by a like plurality of female splines 114 formed within or secured to the housing 12. Axially aligned with the friction brake assembly 100 is an electrical, hydraulic or pneumatic operator or actuator 116. When the operator or actuator 116 is de-energized, the friction brake assembly 100 is relaxed (uncompressed) and no torque is transmitted therethrough. When the operator or actuator 116 is energized, the friction brake assembly 100 is compressed and torque is transmitted therethrough, connecting the planet gear carrier 54 of the planetary gear assembly 50 to the housing 12 (ground) thereby providing reverse direction for the automatic transmission 10.

It will be appreciated that the variable ratio device 60 is a belt or chain and dual pulley device and thus that it includes two variable diameter pulleys, a first or drive pulley 120A, a second or driven pulley 120B, a belt or multi-link chain 122 which engages and partially encircles both of the variable diameter pulleys 120A and 120B and suitable hydraulic operators 124 which increase the effective diameter of one of the pulleys 120A or 120B while decreasing the other, and vice versa, in accordance with conventional variable ratio device practice to achieve a continuously variable drive ratio between the pulleys 120A and 120B over a predetermined range. The second or driven pulley 120B is coupled to and drives a final drive assembly 128 which may include a prop shaft, a differential and drive axles (all not illustrated).

Figure 2:
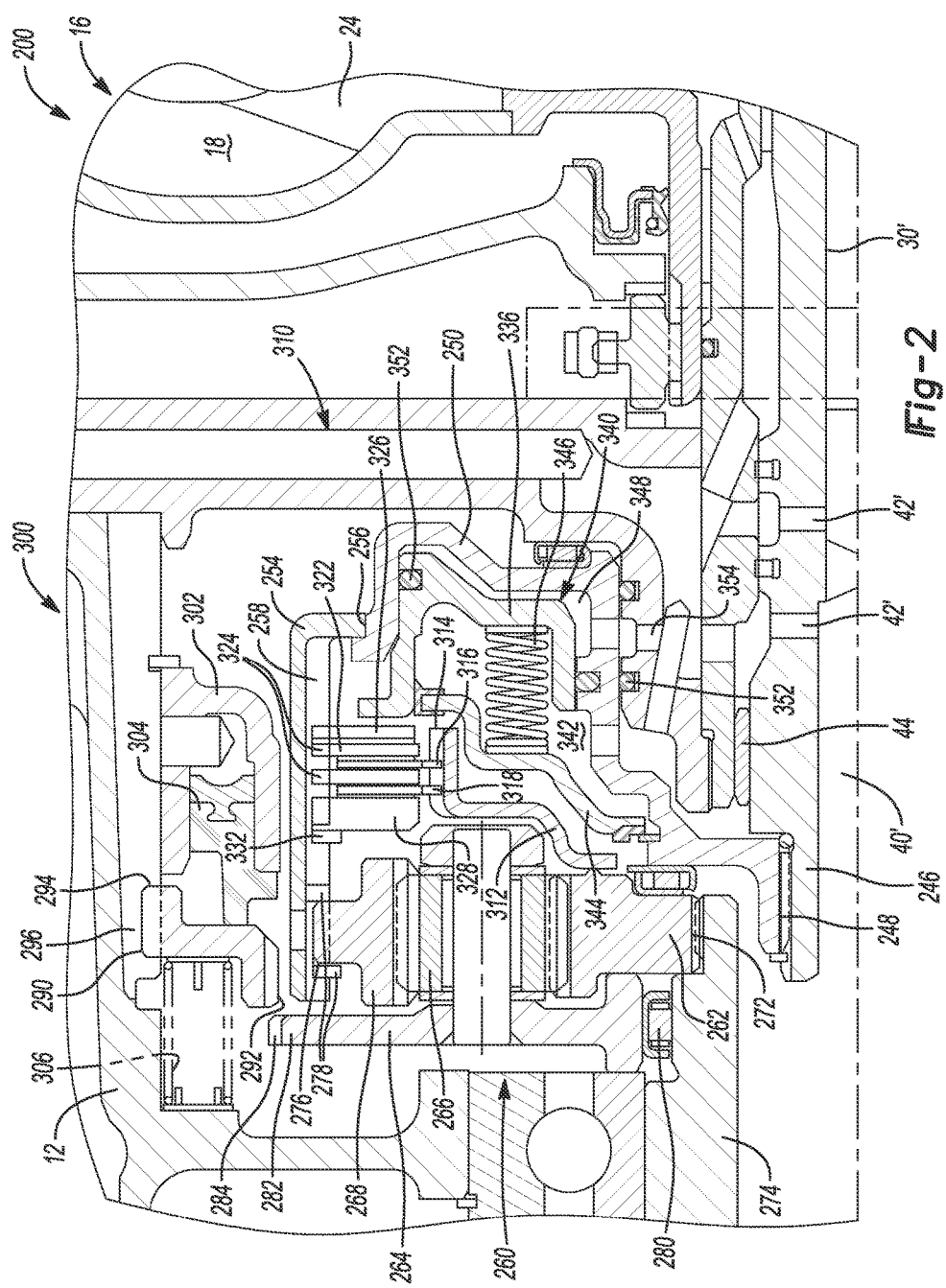
FIG. 2 is a fragmentary, sectional view of a second embodiment of a continuously variable transmission incorporating the present invention.

Referring now to FIGS. 1 and 2, a second embodiment of a continuously variable automatic transmission incorporating the two torque transmitting devices of the present invention is illustrated and generally designated by the reference number 200. The second embodiment continuously variable automatic transmission 200 is similar in many respects to the first embodiment continuously variable automatic transmission 10 illustrated in FIG. 1 and thus includes the cast metal, multiple part housing 12, the input shaft or member 14 which drives the torque converter assembly 16 having an input pump 18, an output turbine 22 and the stator 24. The turbine 22 is coupled to and drives the damper 28 which is piloted on the turbine shaft or member 30' and which is coupled to and driven by the damper 28 through the interconnected male and female spline set 34.

The turbine shaft or member 30' is hollow and defines a through axial passageway 40' which is supplied with pressurized hydraulic fluid which is dispersed within the automatic transmission through a plurality of radial ports 42'. The turbine shaft or member 30' is supported at its ends by a pair of anti-friction bearings such as needle bearing assemblies 44, one of which is illustrated in FIG. 2. The terminus of the turbine shaft or member 30' includes male spines or gear teeth 246 disposed about its periphery which engage and drive female splines 248 on a complexly configured hub 250. The hub 250, in turn, is coupled to an annular clutch hub or housing 254 by a weld 256. The clutch hub or housing 254 includes internal (female) splines 258.

Generally axially adjacent the hub 250 and the housing 254 is a planetary gear assembly 260. The planetary gear assembly 260 is disposed concentrically about the turbine shaft 30' and includes a sun gear 262, a planet gear carrier 264 and an annular ring gear 268. The planet gear carrier 264 includes a plurality of freely rotatable planet gears 266 which are in constant mesh with the sun gear 262 and the annular ring gear 268.

The sun gear 262 is the output gear of the planetary gear assembly 260 and is coupled through an interconnected male and female spline set 272 to a hollow shaft, quill or sheave 274 which is coupled to and drives the first pulley assembly 120 of the variable ratio device 60 illustrated in FIG. 1. The ring gear 268 is the input gear of the planetary gear assembly 260 and includes external or male splines 276 which mate with the female splines 258 of the clutch housing 254. One or more snap rings 278 received within suitable grooves in the clutch housing 254 retain the ring gear in its proper axial position. The clutch housing 254 is, in turn, coupled to the turbine shaft or member 30' through the complexly configured hub 250 as well as the splines 246 and 248.

The planet gear carrier 264 is supported by a roller bearing assembly 280 which is, in turn, supported and piloted on the hollow shaft or quill 274. The planet gear carrier 264 includes a circular extension or flange 282 which extends radially beyond the clutch hub or housing 254 and includes external or male dog clutch teeth 284 about its periphery. A circular sleeve 290 having internal or female dog clutch teeth 292 complementary to and engageable with the dog clutch teeth 284 on the flange 282 of the planet gear carrier 264 resides to one side of the flange 282. The circular sleeve 290 includes male or external splines 294 about its periphery which mate with internal or female splines 296 on the inside of the housing 12. The circular sleeve 290 is thus non-rotatable but is free to translate axially. On one side of the circular sleeve 290 (the right side as viewed in FIG. 2) is disposed a hydraulic actuator assembly 300.

The hydraulic actuator assembly 300 includes a cylinder block 302 having an axially slidable piston and seal assembly 304 disposed therein. The piston and seal assembly 304 aligns and abuts the circular sleeve 290 and translates it to the left in FIG. 2 to engage the male and female dog clutch teeth 284 and 292 and inhibit rotation of the planet gear carrier 264 when pressurized hydraulic fluid is supplied to the cylinder block 302. This provides reverse output direction for the transmission 200. A plurality of return springs 306, one of which is illustrated in FIG. 2, disposed on the opposite side of the circular sleeve 290 from the actuator assembly 300, provides a biasing force that translates the circular sleeve 290 to the right in FIG. 2 to disengage the dog clutch teeth 284 and 292 and free the planet gear carrier 264 when hydraulic fluid pressure is relaxed and hydraulic fluid is exhausted from the cylinder block 302, thereby disengaging reverse.

Returning then to the planetary gear assembly 260, a forward clutch assembly 310 is disposed generally within the hub 250, the housing 254 and adjacent the planetary gear assembly 260. The forward clutch assembly 310 includes an inner hub 312 which is secured to the sun gear 262 and has male or external splines 314 which are complementary to and engage female or internal splines 316 on a first plurality of clutch plates 318. The clutch plates 318 are interleaved within a second plurality of reaction plates 322. The second plurality of reaction plates 322 include male or external splines 324 which are complementary to and engage the female or internal splines 258 of the clutch hub or housing 254. At one end of the stack of clutch plates 318 and reaction plates 322, the right end as viewed in FIG. 2, is an apply plate 326 and at the opposite end is a backing plate 328 which is fixed in its axial position by a snap ring 332.

Adjacent the apply plate 326 and providing axial compressive force thereto, is an annular piston 336 of a hydraulic operator or actuator 340. The actuator 340 is a balanced actuator and, as such, includes a first fluid filled compensating chamber 342 defined on one side by the annular piston 336 and on the other side by a fixed, shaped, circular plate 344 within which resides a plurality of compression springs 346, one of which is illustrated in FIG. 2 and an operating chamber 348 which is defined on one side by the annular piston 336 and on the other side by the hub 250. Suitable O-ring seals 352 are preferably utilized to provide a fluid tight seal about the operating chamber 348. Supplying pressurized hydraulic fluid to the operating chamber 348 through passageways 354 translates the annular piston 336 to the left in FIG. 2 to engage the forward clutch assembly 310 and relaxation of such pressure allows the annular piston to translate to the right in FIG. 2 under the force of the compression springs 346 to disengage the forward clutch assembly 310.

Figure 3:
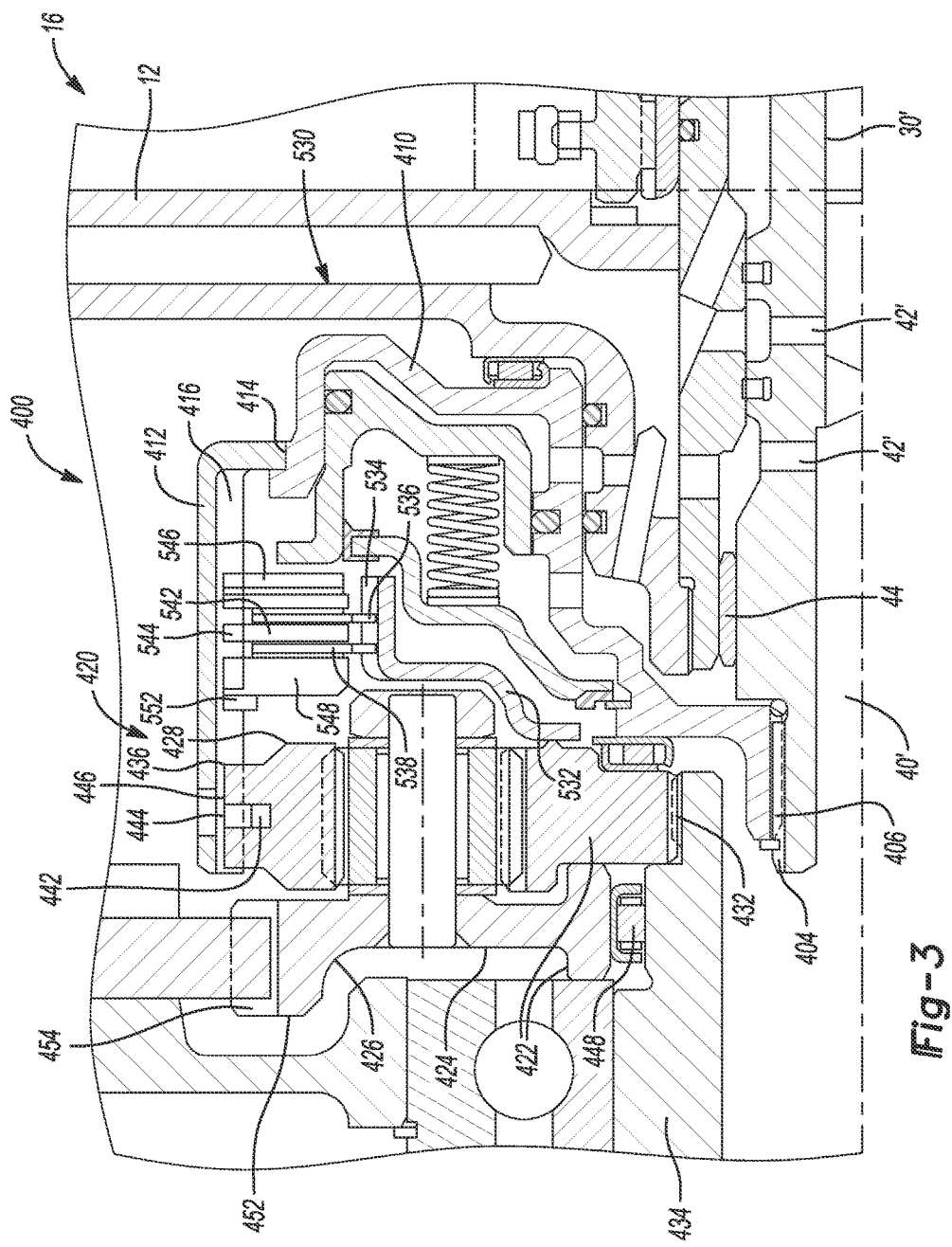
FIG. 3 is a fragmentary, sectional view of a third embodiment of a continuously variable transmission incorporating the present invention.
Figure 4:
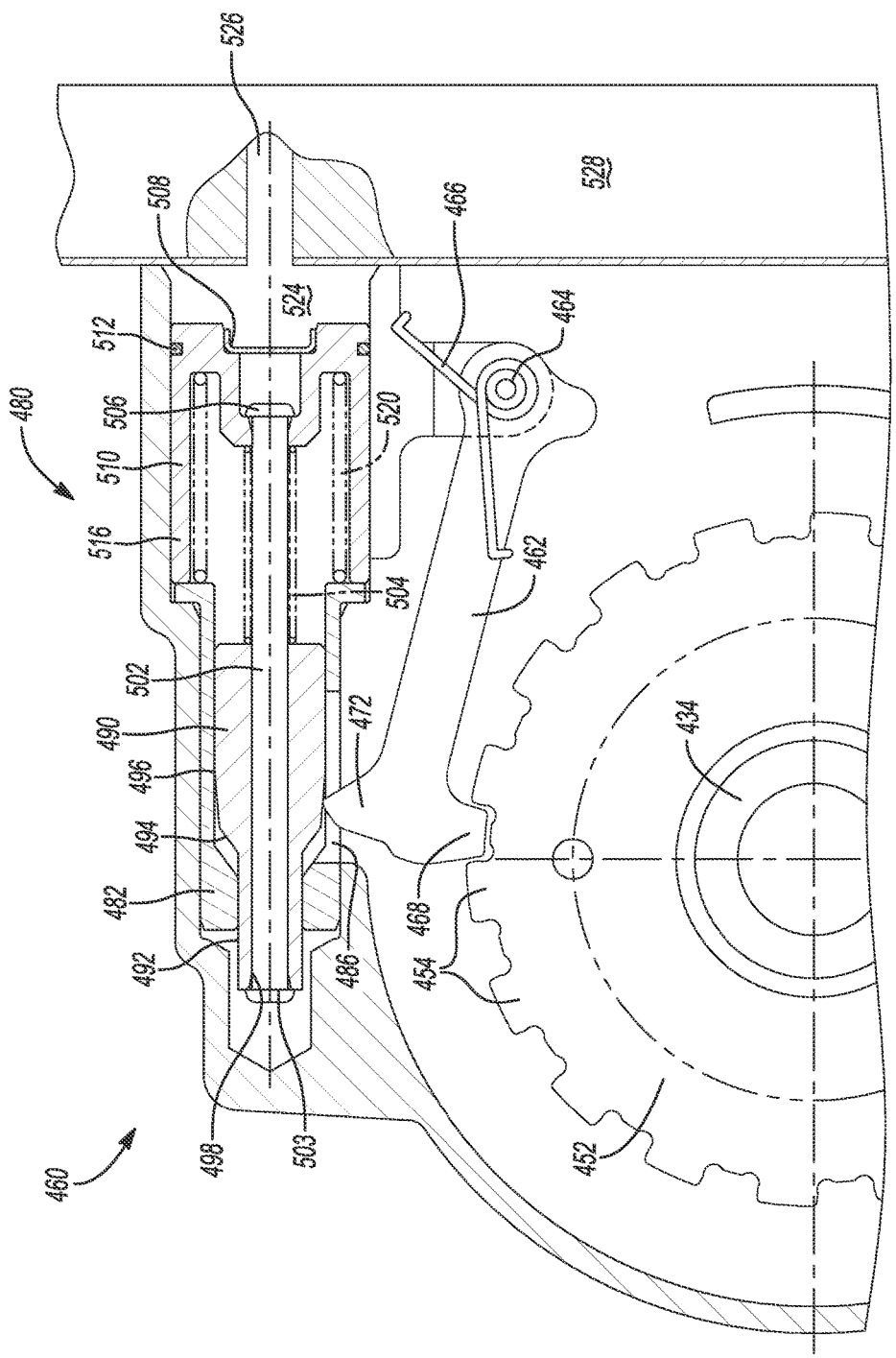
FIG. 4 is of a fragmentary, end view of a third embodiment of a continuously variable transmission incorporating the present invention.

Referring now to FIGS. 1, 3 and 4, a third embodiment of a continuously variable automatic transmission incorporating the two torque transmitting devices of the present invention is illustrated and generally designated by the reference number 400. The third embodiment continuously variable automatic transmission 400 is similar in many respects to the first embodiment continuously variable automatic transmission 10 illustrated in FIG. 1 and the second embodiment continuously variable automatic transmission 200 illustrated in FIG. 2 and thus includes the cast metal, multiple part housing 12, the input shaft or member 14 which drives the torque converter assembly 16 having an input, the pump 18, an output, the turbine 22 and the stator 24. The turbine 22 is coupled to and drives the damper 28 which is piloted on the turbine shaft or member 30' and which is coupled to and driven by the damper 28 through the interconnected male and female spline set 34.

The turbine shaft or member 30' is hollow and defines a through axial passageway 40' which is supplied with pressurized hydraulic fluid which is dispersed within the automatic transmission through a plurality of radial ports 42'. The turbine shaft or member 30' is supported at its ends by a pair of bushings 44', one of which is illustrated in FIG. 3. The terminus of the turbine shaft or member 30' includes male spines or gear teeth 404 disposed about its periphery which engage and drive female splines 406 on a complexly configured hub 410. The hub 410, in turn, is coupled to an annular clutch hub or housing 412 through an interconnected male and female spline set 414. The clutch hub or housing 412 includes internal (female) splines 416.

Generally axially adjacent the hub 410 and the clutch housing 412 is a planetary gear assembly 420. The planetary gear assembly 420 is disposed concentrically about the turbine shaft 30' and includes a sun gear 422, a planet gear carrier 424 and an annular ring gear 428. The planet gear carrier 424 includes a plurality of freely rotatable planet gears 426 which are in constant mesh with the sun gear 422 and the annular ring gear 428.

The sun gear 422 is the output gear of the planetary gear assembly 420 and is coupled through an interconnected male and female spline set 432 to a hollow shaft, quill or sheave 434 which is coupled to and drives the first pulley assembly 120 of the variable ratio device 60 illustrated in FIG. 1. The ring gear 428 is the input gear of the planetary gear assembly 420 and includes external or male splines 436 which mate with the female splines 416 in the clutch housing 412. The ring gear 428 includes a peripheral channel or groove 442 which receives a snap ring 444. The snap ring 444 is received within a channel or groove 446 formed in the female splines 416 on the inner surface of the clutch hub or housing 412 and thus axially locates and retains the ring gear 428 in the clutch hub or housing 412. The clutch hub or housing 412 is, in turn, coupled to the turbine shaft or member 30' through the complexly configured hub 410 as well as the splines 404, 406 and 414.

The planet gear carrier 424 is supported by a roller bearing assembly 448 which is, in turn, supported and piloted on the hollow shaft, quill or sheave 434. The planet gear carrier 424 includes an axially offset circular flange, wheel or hub 452 which includes a plurality of coarse external teeth 454 disposed about its periphery. The side faces of the external teeth 454 are preferably disposed in a radial planes. In the embodiment illustrated, eighteen external teeth 454 reside on the periphery of the wheel or hub 452 but it will be appreciated that more or fewer teeth may be utilized if desired, depending upon, for example, torque load and the diameter of the wheel or hub 452.

Referring now to FIG. 3 and especially FIG. 4, a reverse binary clutch assembly 460 includes an elongate pawl 462 disposed on a pivot pin 464 having an axis parallel to the axis of the hollow shaft, quill or sheave 434. Wrapped about the pivot pin 464 and having ends which engage the housing 12 and the elongate pawl 462 is a torsional spring 466. The torsional spring 466 biases the elongate pawl 462 clockwise about the pivot pin 464, away from the teeth 454 and the wheel or hub 452. The end of the elongate pawl 462 opposite the pivot pin 464 and proximate the wheel or hub 452 defines a tooth 468 which is complementary to and positively engages the teeth 454 of the wheel or hub 452. The end of the elongate pawl 462 opposite the pivot pin 464 and opposite the wheel or hub 452 defines a lug or projection 472.

Adjacent the elongate pawl 462 and cooperating with the lug or projection 472 of is a reverse engagement hydraulic operator or actuator assembly 480. The hydraulic operator or actuator assembly 480 is generally aligned with the elongate pawl 462 and includes a cylindrical actuator guide 482, which is pressed into a complementary opening in the housing 12. The actuator guide 482 includes a slot 486 or similar opening or cutout in its sidewall which receives the lug or projection 472 of the elongate pawl 462. Disposed for axial translation within the actuator guide 482 is an actuator 490. The actuator 490 defines a first, smaller diameter region or portion 492, a second, intermediate frusto-conical region or portion 494 and a third, larger diameter region or portion 496.

The actuator 490 also defines a through cylindrical passageway 498 which receives an actuator shaft or rod 502 upon which the actuator 490 is freely translatable. At the left end of the actuator shaft or rod 502 is an enlarged head or flange 503 which limits translation of the actuator 490 thereon. An actuator compression spring 504 is received about the actuator rod or shaft 502 and biases the actuator 490 to the left in FIG. 4, away from a piston 510 within which the actuator shaft or rod 502 terminates. The actuator rod or shaft 502 is received within the piston 510 and is retained there by a second enlarged head or flange 506. A plug 508 seals the end of the piston 510. The piston 510 includes an O-ring seal 512 and a skirt 516 that, in its leftmost position illustrated in FIG. 4, contacts the actuator guide 482 and thus limits its translation toward the actuator 490. A return compression spring 520 is disposed within piston 510 and biases it to the right in FIG. 4. To the right of the piston 510 is a fluid chamber 524 which may be filled with pressurized hydraulic fluid (transmission oil) through a port 526 in a valve body 528.

When reverse is selected, the valve body 528 of the transmission 400 provides pressurized hydraulic fluid (transmission oil) to the fluid chamber 524, translating the piston 510 to the left, to the position illustrated in FIG. 4. This axial translation of the piston 510 compresses the actuator compression spring 504 which urges the actuator 490 to the left. However, until the tooth 468 of the elongate pawl 462 is aligned with a space or interval between the teeth 454 of the wheel or hub 452 such that it can engage the teeth 454, the lug or projection 472 of the elongate pawl 462 will remain in contact with the first, smaller diameter region 492 of the actuator 490, adjacent the second, intermediate region 494. In this state, the actuator compression spring 504, working through the actuator 490, will continue to urge the elongate pawl 462 counter-clockwise to seat the tooth 468 into a space or interval between the teeth 454 of the wheel or hub 452. When this occurs, the actuator 490 will complete its translation to the left, to the position illustrated in FIG. 4, the lug or projection 472 will be in contact with the third, larger diameter region 496 of the actuator 490 and rotation of the wheel or hub 452 and that of the planet gear carrier 464 will be inhibited. This provides reverse direction to the transmission 400.

When hydraulic fluid pressure is relaxed and hydraulic fluid is exhausted from the fluid chamber 524, the piston 510 translates to the right in FIG. 4 due to the force provided by the return compression spring 520, the actuator rod or shaft 502, the enlarged head 503 and the actuator 490 are translated to the right by the piston 510, the lug or projection 472 encounters the first, smaller diameter region 492 of the actuator 490, and, due to the biasing force provided by the torsional spring 464, the elongate pawl 462 moves away (clockwise as viewed in FIG. 4) from the wheel or hub 452, thereby releasing the wheel or hub 452 and the planet gear carrier 424 and terminating reverse.

It should be appreciated that because the elongate pawl 462, and specifically the latch tooth 468, can stop rotation of the wheel or hub 452 and the attached planet gear carrier 424 when it is rotating slowly, it is possible to shift into reverse when the vehicle is moving at a slow speed. Similarly, it is possible to shift from reverse to drive when the vehicle is rolling backward.

Returning then to the planetary gear assembly 420, a forward clutch assembly 530 is disposed generally within the hub 410, the housing 412 and adjacent the planetary gear assembly 420. The forward clutch assembly 530 includes an inner hub 532 which is secured to the sun gear 422 and has male or external splines 534 which are complementary to and engage female or internal splines 536 on a first plurality of clutch plates 538. The clutch plates 538 are interleaved within a second plurality of reaction plates 542. The second plurality of reaction plates 542 include male or external splines 544 which are complementary to and engage the female or internal splines 416 of the clutch hub or housing 412. At one end of the stack of clutch plates 538 and reaction plates 542, the right end as viewed in FIG. 3, is an apply plate 546 and at the opposite end is a backing plate 548 which is fixed in its axial position by a snap ring 552. When the forward clutch assembly 530 is engaged, the transmission 400 provides forward motion.

In operation, it will be appreciated that the three embodiments of a continuously variable automatic transmission 10, 200 and 400 all exhibit reduced spin losses due to the replacement of one of the conventional torque transmitting devices, i.e., either a friction pack clutch or brake, with a binary, e.g., dog clutch, thereby eliminating the friction generated and accompanying energy (spin) loss occurring between the clutch discs and reaction plates rotating at different speeds when the clutch or brake is disengaged.

The description of the invention is merely exemplary in nature and variations that do not depart from the gist of the invention are intended to be within the scope of the invention. Such variations are not to be regarded as a departure from the spirit and scope of the invention.

What is claimed is:

1. A continuously variable automatic transmission comprising, in combination, a housing, an input member, a torque converter having a pump connected to said input member, a stator, a turbine and a turbine shaft, a damper having an input coupled to said turbine and an output coupled to said turbine shaft, a variable ratio device having a variable diameter input pulley, a variable diameter output pulley and a chain engaging said variable diameter pulleys, a planetary gear assembly having a sun gear, a ring gear and a planet gear carrier supporting a plurality of freely rotatable planet gears in constant mesh with said sun gear and said ring gear, said turbine shaft driving said ring gear and said sun gear driving said variable diameter input pulley, a first torque transmitting device operably disposed between planet gear carrier and said housing for providing reverse direction, and a second torque transmitting device operably disposed between said planet gear carrier and said ring gear for providing forward direction, wherein said second torque transmitting device is a dog clutch.

2. The continuously variable automatic transmission of claim 1 wherein said first torque transmitting device is a friction brake having a plurality of interleaved clutch discs and reaction plates.

3. The continuously variable automatic transmission of claim 1 wherein said first torque transmitting device is a dog clutch.

4. The continuously variable automatic transmission of claim 1 wherein said turbine shaft is a hollow shaft having a plurality of radial ports for providing lubrication to said transmission.

5. The continuously variable automatic transmission of claim 1 further including an actuator for each of said first and second torque transmitting devices.

6. The continuously variable automatic transmission of claim 1 wherein said first torque transmitting device is a brake and includes a flange having teeth about its periphery, a pawl having a latch which selectively engages said teeth on said periphery and an actuator for translating said pawl into engagement with said teeth.

7. The continuously variable automatic transmission of claim 1 further including a final drive assembly driven by said variable diameter output pulley.

8. A continuously variable automatic transmission comprising, in combination, a housing, an input member, a torque converter having a pump connected to said input member, a stator and a turbine, a damper having an input connected to said turbine and an output connected to an output member, a variable ratio device having a pair of variable diameter pulleys, a respective pair of actuators for adjusting said pulleys and a multilink chain encircling said pulleys, a planetary gear assembly having a sun gear, a ring gear and a planet gear carrier supporting a plurality of freely rotatable planet gears in constant mesh with said sun gear and said ring gear, said output member driving said ring gear and said sun gear coupled to one of said variable diameter pulleys, a first torque transmitting device disposed between planet gear carrier and said housing for providing reverse direction, and a second torque transmitting device operably disposed between said planet gear carrier and said ring gear for providing forward direction, wherein said second torque transmitting device is a dog clutch having a collar translated by a hydraulic actuator.

9. The continuously variable automatic transmission of claim 8 wherein said first torque transmitting device is a friction brake having a plurality of interleaved clutch discs and reaction plates and a hydraulic actuator.

10. The continuously variable automatic transmission of claim 8 wherein said first torque transmitting device is a brake having complementary teeth engaged by a hydraulic actuator.

11. The continuously variable automatic transmission of claim 8 wherein said first torque transmitting device is a brake and includes a flange having teeth about its periphery, a pawl having a latch which selectively engages said teeth on said periphery and an actuator for translating said pawl into engagement with said teeth.

12. The continuously variable automatic transmission of claim 8 further including a final drive assembly driven by another of said variable diameter pulleys.

* * * * *